(12) United States Patent
Horn

(10) Patent No.: US 11,336,079 B2
(45) Date of Patent: May 17, 2022

(54) TRANSIT WITH SMOKE AND FIRE PROTECTION

(71) Applicant: Roxtec AB, Karlskrona (SE)

(72) Inventor: Olaf Horn, Ammersbek (DE)

(73) Assignee: Roxtec AB, Karlskrona (SE)

( * ) Notice: Subject to any disclaimer, the term of this patent is extended or adjusted under 35 U.S.C. 154(b) by 561 days.

(21) Appl. No.: 16/473,531

(22) PCT Filed: Dec. 20, 2017

(86) PCT No.: PCT/EP2017/083892
§ 371 (c)(1),
(2) Date: Jun. 25, 2019

(87) PCT Pub. No.: WO2018/127423
PCT Pub. Date: Jul. 12, 2018

(65) Prior Publication Data
US 2020/0153211 A1    May 14, 2020

(30) Foreign Application Priority Data

Jan. 5, 2017    (EP) ..................................... 17150364

(51) Int. Cl.
| H02G 3/04 | (2006.01) |
| A62C 3/16 | (2006.01) |
| F16L 5/04 | (2006.01) |
| H02G 3/40 | (2006.01) |

(52) U.S. Cl.
CPC ............. *H02G 3/0412* (2013.01); *A62C 3/16* (2013.01); *F16L 5/04* (2013.01)

(58) Field of Classification Search
CPC ........ H02G 3/0412; H02G 3/40; H02G 3/386; H02G 3/38; H02G 3/36; A62C 3/16; F16L 5/00; F16L 5/04
See application file for complete search history.

(56) References Cited

U.S. PATENT DOCUMENTS 4,086,736 A * 5/1978 Landrigan ................. F16L 5/04
52/220.8
4,424,867 A * 1/1984 Mallow .................... H02G 3/22
174/505
(Continued)

FOREIGN PATENT DOCUMENTS

| CN | 102245950 A | 11/2011 |
| DE | 4017656 A1 | 12/1991 |

(Continued)

OTHER PUBLICATIONS

Japanese Office Action for JP Application No. 2019-535279 dated Nov. 16, 2021 (6 pages, with English translation).

(Continued)

*Primary Examiner* — Hoa C Nguyen
*Assistant Examiner* — Amol H Patel
(74) *Attorney, Agent, or Firm* — Merchant & Gould P.C.

(57) ABSTRACT

The present invention concerns a transit for cables, a cable bundle (9) or a bus bar (12). The transit comprises a sleeve (1) having a through opening (2) for receiving the cables or the bus bar (12). The sleeve (1) is to be received in a through opening (5) of a partition (4). A glass fiber tissue hose (7) is placed going through the opening of the sleeve (1). The ends of the tissue hose (7) is wrapped back and placed on the outside of the sleeve (1). One or more intumescent strips (6) are placed between the inside of the sleeve (1) and the tissue hose (7). A fire retarding agent (10) is placed around and between the cables or around the bus bar (12).

12 Claims, 2 Drawing Sheets

(56) References Cited

U.S. PATENT DOCUMENTS

| | | | | |
|---|---|---|---|---|
| 5,174,077 A | * | 12/1992 | Murota | F16L 5/04 52/220.8 |
| 5,456,050 A | * | 10/1995 | Ward | H02G 3/0412 52/220.8 |
| 6,862,852 B1 | * | 3/2005 | Beele | F16L 5/04 52/220.8 |
| 11,242,946 B2 | * | 2/2022 | Paetow | F16L 5/04 |
| 2017/0232281 A1 | * | 8/2017 | Rakic | H02G 3/22 169/43 |
| 2018/0106395 A1 | * | 4/2018 | Hulteen | F16L 55/0336 |
| 2020/0080666 A1 | * | 3/2020 | Rakic | E04B 1/947 |
| 2020/0271243 A1 | * | 8/2020 | Beele | H02G 3/22 |

FOREIGN PATENT DOCUMENTS

| | | |
|---|---|---|
| DE | 19905103 A1 | 8/2000 |
| DE | 20103110 | 8/2001 |
| DE | 102006001644 B4 | 7/2007 |
| DE | 102015101233 A1 | 7/2016 |
| EA | 014133 | 10/2010 |
| EP | 0536331 A1 | 4/1993 |
| EP | 3051194 A1 | 8/2016 |
| JP | S54-12896 U | 1/1979 |
| JP | S57-203459 A | 12/1982 |
| JP | S62-177227 U | 11/1987 |
| JP | H05-506494 A | 9/1993 |
| JP | 2015033172 A | 2/2015 |
| RU | 94045910 A | 6/1996 |

OTHER PUBLICATIONS

Russian Decision to Grant for RU Application No. 2019120607/07 dated Dec. 16, 2020 (8 pages).

Chinese Office Action for CN Application No. 201780081992.7 dated May 7, 2020 (English Translation provided), 13 pages.

International Search Report and Written Opinion for PCT/EP2017/083892, dated Jan. 31, 2018.

* cited by examiner

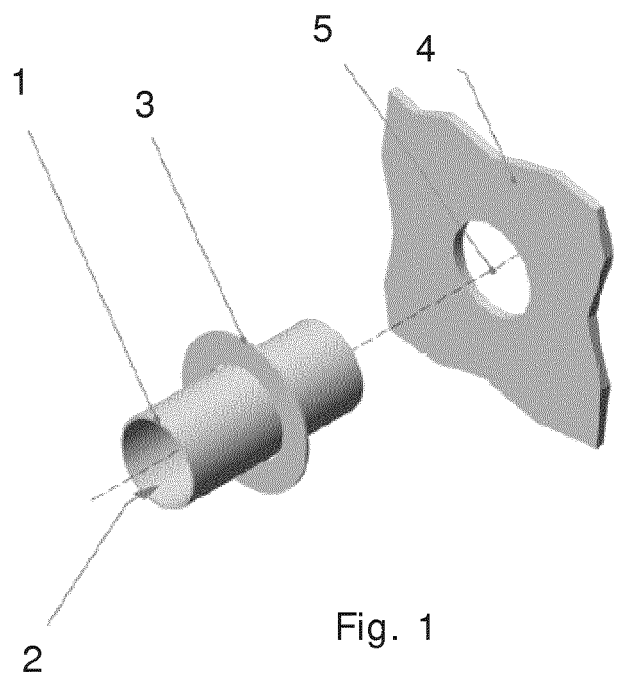
Fig. 1
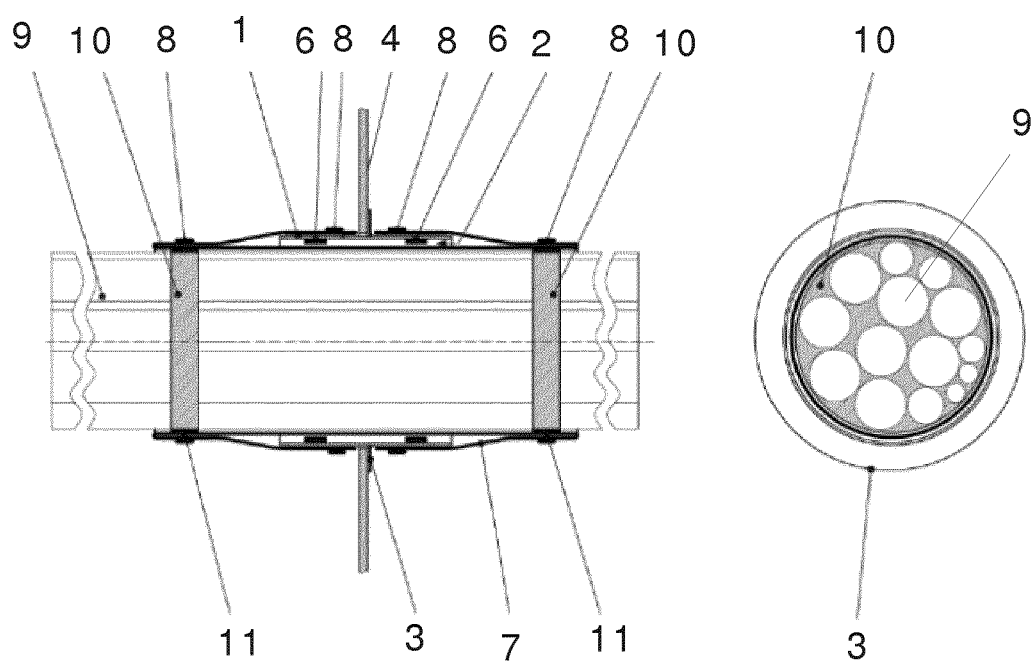
Fig. 2a
Fig. 2b

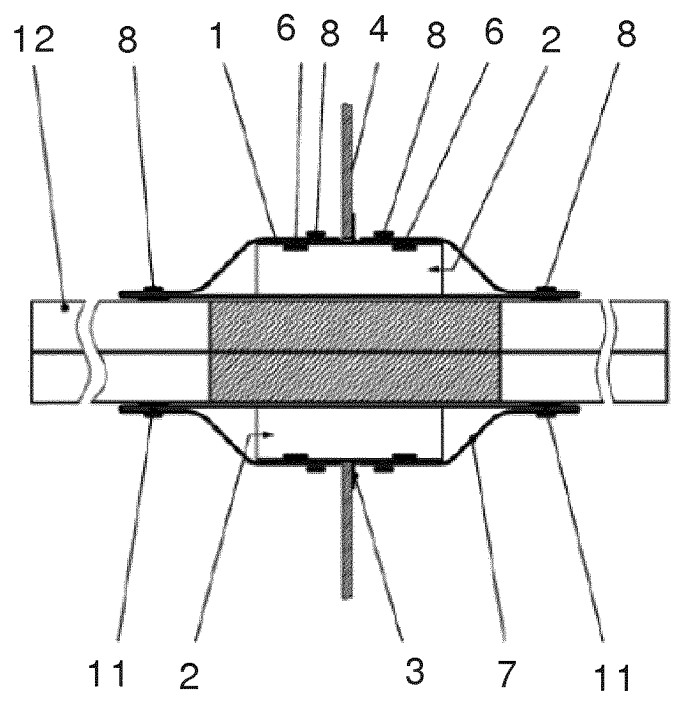
Fig. 3a
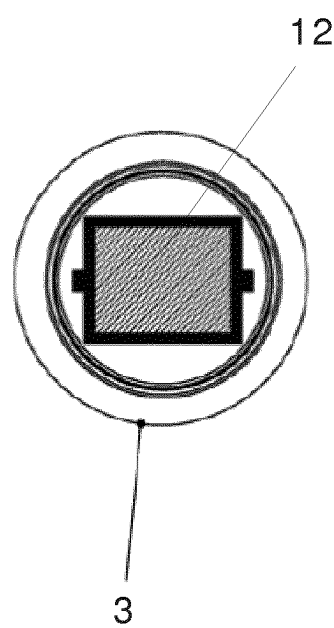
Fig. 3b
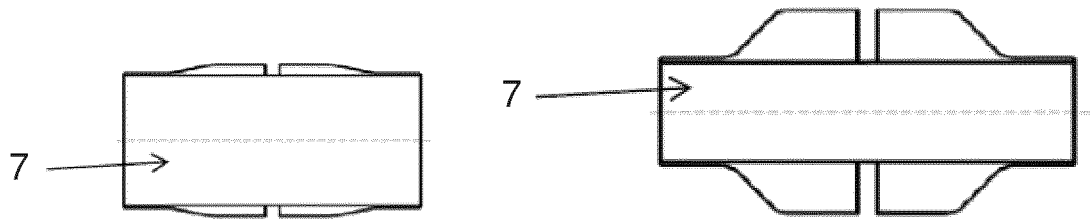
Fig. 4
Fig. 5

TRANSIT WITH SMOKE AND FIRE PROTECTION

This application is a National Stage Application of PCT/EP2017/083892, filed 20 Dec. 2017, which claims the benefit of priority to European Patent Application No. 17150364.2, filed 5 Jan. 2017, which applications are incorporated herein by reference. To the extent appropriate, a claim of priority is made to each of the above disclosed applications.

TECHNICAL FIELD

The present invention concerns a transit for cables and bus bars, which transit gives smoke and fire protection.

BACKGROUND

Cables and bus bars are often passed through openings in different types of partitions by means of transits. Such partitions could be walls, roofs, bulkheads or decks of ships, as well as walls or roofs of buildings or different types of cabinets. The cables are often in the form of a cable bundle but it is also possible to have one or more separate cables.

Transits are normally to give a seal between the different areas on respective side of a partition receiving the transit. Often the transit is to give a smoke and/or fire protection, i.e. to hinder smoke and/or fire to go from one side of the transit to the other side of the transit. An intumescent material is often used for such a protection. As is well known to a person skilled in the art an intumescent material will swell when exposed to extensive heat, such as by fire.

SUMMARY

The transit of the present invention is mainly developed for placement in bulkheads and decks of ships, but it is possible to use also for other types of partitions.

The transit has been developed for giving a simple installation of one or more cables or bus bars. The transit may be installed vertically or horizontal or at angles there between. The transit is to receive one or more cables or electrical bus bars for passage through a wall or other partition.

According to one aspect of the present invention a sleeve of the transit has a through opening for receiving cables or a bus bar. The sleeve is to be received in a through opening of a partition. A tissue hose is placed going through the opening of the sleeve. The ends of the tissue hose is wrapped back and placed on the outside of the sleeve. One or more intumescent strips are placed between the inside of the sleeve and the tissue hose. Further, a fire retarding agent is placed around and between the cables or around the bus bar.

Further objects and advantages of the invention will be obvious to a person skilled in the art when reading the detailed description below of embodiments of the present invention.

BRIEF DESCRIPTION OF THE DRAWINGS

The invention will be described further below by way of example and with reference to the enclosed drawings. In the drawings:

FIG. 1 is a perspective view of a part of the transit of the present invention with a partition indicated, in which partition the transit is to be installed, FIG. 2a is a cross section view of one embodiment of the transit of the invention as installed, FIG. 2b is an end view of the transit of FIG. 2a, FIG. 3a is a cross section view corresponding to FIG. 2a of a further embodiment of the transit of the invention as installed, FIG. 3b is an end view of the transit of FIG. 3a, FIG. 4 is a cross section view of a part of the transit of FIGS. 2a and 2b, and FIG. 5 is a cross section view of a part of the transit of FIGS. 3a and 3b.

DETAILED DESCRIPTION OF EMBODIMENTS

The transit comprises a sleeve 1, which sleeve 1 has an inner through opening 2. Further, the sleeve 1 has a flange 3 on the outer circumference of the sleeve 1. The flange 3 projects at right angle in relation to the through opening 2 of the sleeve 1 and the flange 3 goes all around the sleeve 1. The flange 3 is circumferentially welded on the outside of the sleeve 1. The sleeve 1 is to be placed in an opening 5 of a wall or partition 4. The sleeve 1 and the flange 3 are normally made of a metal and also the partition 4 is normally made of a metal. The sleeve 1 is normally fastened to the partition 4 in that the flange 3 of the sleeve 1 is welded to the partition. The welding may be circumferential or the flange 3 may be spot welded. In the fasten position the ends of the sleeve 1 projects on opposite sides of the partition 4.

A cable, cable bundle 9 or bus bar 12 is to be received inside the through opening 2 of the sleeve 1. In FIGS. 2a and 2b the transit is shown when receiving a cable bundle 9 and in FIGS. 3a and 3b the transit is shown when receiving a bus bar 12.

One or more intumescent strips 6 are placed circumferentially on the inside of the sleeve 1 on each part projecting on opposite sides of the partition 4. In case of fire or excessive heat, the intumescent material of the intumescent strip 6 will swell and close of the through opening 2 of the sleeve 1. The intumescent strips 6 on the inside of the sleeve 1 can have one or more layers.

A glass fiber tissue hose 7 goes through the opening 2 of the sleeve 1 and is wrapped back on the outside of the sleeve 1. The cable, cable bundle 9 or bus bar 12 is to be routed inside the tissue hose 7 inside the sleeve 1. In FIGS. 4 and 5 the tissue hose 7 is shown in the form as installed in connection with the cable bundle 9 and the bus bar 12, respectively. The end of each wrapped back part of the tissue hose 7 is placed relatively close to the flange 3 of the sleeve 1 and is fasten to the sleeve 1 by means of a metal strap 8 surrounding the tissue hose 7 on the sleeve 1. In one embodiment the metal strap 8 is coated with a plastic. The tissue hose 7 extends a distance beyond the sleeve 1 at both ends and is fasten to the cable, cable bundle 9 or the bus bar 12 by means of metal straps 8 of the same type as used for fastening the tissue hose 7 to the sleeve 1. The metal straps 8 for fastening the tissue hose 7 to the cable, cable bundle 9 or bus bar 12 are normally placed close to the positions at which the tissue hose 7 is wrapped back. The glass fiber tissue hose 7 is describing a defined surface on both sides of the transit and prevents light and cold smoke emission and disables mechanical penetration of any objects.

A layer of soft material 11, with or without intumescent features, is wrapped on the outside surface of the cable, cable bundle 9 or bus bar 12 on each side of the sleeve 1. A fire retarding agent 10 is placed around and between the cables inside the sleeve 1. The fire retarding agent 10 will close all gaps between the cables on both sides of the fire transit. In one embodiment the fire retarding agent 10 is a fire resistant seal, such as a smoke and fire resistant gun grade acrylic sealant. In another embodiment the fire retarding agent 10 is a fire sealing paint.

The plastic coated metal straps 8 gives compression and mechanical protection to the transit solution. The metal straps 8 can only be installed and re-opened by use of tools. The fastening using the metal straps 8 guarantees that dust and objects cannot enter the fire transit.

Even before routing of the cables or bus bar there will be some fire protection. The included intumescent features will react, whenever heat radiation expose the intumescent material for more than 160° C. This partial fire protection is given as all components are installed by the manufacturer before the cables or bus bar are routed.

The sleeve 1 may have more than one opening 2. In some embodiments the sleeve 1 has no flange.

The invention claimed is:

1. A transit for cables, a cable bundle or a bus bar, comprising a sleeve having a through opening for receiving the cables or the bus bar, which sleeve is to be received in a through opening of a partition, wherein a glass fiber tissue hose is placed going through the opening of the sleeve, that the ends of the tissue hose is wrapped back and placed on the outside of the sleeve, that one or more intumescent strips are placed between the inside of the and the tissue hose and that a fire retarding agent is placed around and between the cables or around the bus bar.

2. The transit of claim 1, wherein a flange is welded circumferentially on the outside of the sleeve.

3. The transit of claim 2, wherein the flange of the sleeve is configured to be welded to the partition.

4. The transit of claim 1, wherein one intumescent strip is placed between the inside of the sleeve and the tissue hose at each of opposite ends of the through opening of the sleeve.

5. The transit of claim 1, wherein the wrapped back ends of the tissue hose are fastened on the outside of the sleeve by means of metal strap.

6. The transit of claim 5, wherein the metal strap are coated with a plastic material.

7. The transit of claim 1, wherein the tissue hose projects beyond the sleeve at opposite sides and wherein said projecting parts of the tissue hose are fastened to the outside of the cable, cable bundle or bus bar by means of metal strap.

8. The transit of claim 7, wherein a layer of soft material is placed between the tissue hose and the cable, cable bundle or bus bar at the area where the metal strap fastening the tissue hose to the cable, cable bundle or bus bar are placed.

9. The transit of claim 8, wherein the layer of soft material has intumescent features.

10. The transit of claim 7, wherein the fire sealing paint is placed around and between the cables or around the bus bar at the area where the metal strap fastening the tissue hose to the cable, cable bundle or bus bar are placed.

11. The transit of claim 1, wherein the fire retarding agent is a fire resistant sealant.

12. The transit of claim 1, wherein the fire retarding agent is a fire sealing paint.

\* \* \* \* \*

UNITED STATES PATENT AND TRADEMARK OFFICE
CERTIFICATE OF CORRECTION

PATENT NO. : 11,336,079 B2
APPLICATION NO. : 16/473531
DATED : June 25, 2019
INVENTOR(S) : Olaf Horn It is certified that error appears in the above-identified patent and that said Letters Patent is hereby corrected as shown below:

In the Claims

At Column 3, Line (26), Claim 1, after the term "of the" insert the term --sleeve--.

Signed and Sealed this
Ninth Day of January, 2024

Katherine Kelly Vidal
Director of the United States Patent and Trademark Office